(12) United States Patent
Hayes

(10) Patent No.: US 10,536,028 B2
(45) Date of Patent: Jan. 14, 2020

(54) SYSTEMS AND METHODS FOR SIGNALING A GENERATOR

(71) Applicant: ASCO Power Technologies L.P., Florham Park, NJ (US)

(72) Inventor: John Hayes, Hardwick, NJ (US)

(73) Assignee: ASCO Power Technologies L.P., Florham Park, NJ (US)

(*) Notice: Subject to any disclaimer, the term of this patent is extended or adjusted under 35 U.S.C. 154(b) by 144 days.

(21) Appl. No.: 15/901,927

(22) Filed: Feb. 22, 2018

(65) Prior Publication Data
US 2019/0260222 A1    Aug. 22, 2019

(51) Int. Cl.
*H02J 9/06* (2006.01)
*G05B 15/02* (2006.01)
*G08B 25/00* (2006.01)

(52) U.S. Cl.
CPC ............... *H02J 9/06* (2013.01); *G05B 15/02* (2013.01); *G08B 25/008* (2013.01); *H02J 2009/068* (2013.01)

(58) Field of Classification Search
CPC ...... H02J 9/06; H02J 2009/068; G05B 15/02; G08B 25/008

USPC .......................................................... 307/125
See application file for complete search history.

(56) References Cited

U.S. PATENT DOCUMENTS 8,373,569 B2 *  2/2013  Gilpatrick ............... H04B 3/54
                                                    290/28

* cited by examiner

*Primary Examiner* — Carlos Amaya
(74) *Attorney, Agent, or Firm* — Locke Lord LLP

(57) ABSTRACT

In an example, a method for signaling a generator includes coupling a transmitter to a generator, a receiver to a transfer switch, a first conductor between a first output of the transmitter and a second input of the receiver, and a second conductor between a second output of the receiver and a first input of the transmitter. The method also includes providing an input power signal to the transmitter, and transmitting an electrical-loop signal around a closed loop circuit. After transmitting the electrical-loop signal, the method includes determining a resistance of the closed loop circuit. If the determined resistance is zero or infinite, then the method includes activating an alarm system. If the determined resistance is at a first reference-resistance value, then the method includes maintaining a deactivation of the generator. If the determined resistance is at a second reference-resistance value, then the method includes activating the generator.

20 Claims, 5 Drawing Sheets

| Circuit State | Loop Resistance | Voltage of Input Power Signal | Fault Condition? | Activate Generator | Activate Alarm |
|---|---|---|---|---|---|
| 1 | First Reference-Resistance Value | First Reference-Voltage Value | No | No | No |
| 2 | Second Reference-Resistance Value | Second Reference-Voltage Value | No | Yes | No |
| 3 | Infinite | Greater than First Threshold | Yes (Short Ckt) | No | Yes |
| 4 | Zero | Less than Second Threshold | Yes (Open Ckt) | No | Yes |

Figure 4

SYSTEMS AND METHODS FOR SIGNALING A GENERATOR

FIELD

The present disclosure generally relates to systems and methods for signaling a generator, and more particularly to signal systems and methods for signaling a generator, detecting a fault condition, and providing an alarm when the fault condition is detected.

BACKGROUND

Unless otherwise indicated herein, the materials described in this section are not prior art to the claims in this application and are not admitted to be prior art by inclusion in this section.

Various applications require a nearly constant supply of reliable electrical power to operate effectively. For example, hospitals may require a constant and reliable supply of electricity to ensure medical equipment in operating rooms and the like function when needed. Further, food retailers such as supermarkets and grocery stores may require a constant and reliable supply of electricity to properly operate refrigeration systems associated with display cases and freezers to prevent food spoilage.

While utility companies generally provide electrical power consistently and reliably, such power is sometimes interrupted due to inclement weather, unforeseen accidents, or maintenance. Electrical power consumers seeking to mitigate or avoid even minor interruptions in their power supply often rely on generators and other backup systems to supply electrical power during periods when electrical service from a utility company is interrupted. Transfer switches enable these consumers to switch between a primary electrical source (e.g., from a utility company) and a secondary electrical source (e.g., a generator or other backup system) when one source becomes unreliable or requires maintenance.

Transfer switches may be manual transfer switches where, for example, an operator throws a switch to transfer power from one source to another. Additionally or alternatively, transfer switches may be automatic transfer switches where, for example, the switch automatically senses when a source has lost or gained power and responsively transfers power from one source to another. In one implementation, to transfer power between sources, the transfer switch may initiate a signal sequence in which the transfer switch automatically starts a standby generator and then connects the standby generator to the load. The transfer switch may also automatically reconnect the utility power to the load if utility power is reestablished.

SUMMARY

In an example, a system for signalling a generator includes a transmitter having a first input and a first output. The transmitter is configured to receive an input power signal from a power source. The system also includes a receiver having a second input and a second output, a first conductor coupling the first output of the transmitter to the second input of the receiver, and a second conductor coupling the second output of the receiver to the first input of the transmitter. The transmitter, the receiver, the first conductor, and the second conductor form a closed loop circuit.

The system can also include a controller configured to (i) determine a voltage of the input power signal, (ii) determine, based on the determined voltage of the input power signal, a resistance of the closed loop circuit, (iii) determine, based on the determined resistance of the closed loop circuit, whether to activate the generator, and (iv) determine, based on the determined resistance of the closed loop circuit, whether to activate an alarm system. The transmitter can include a constant-current source configured to use the input power signal to provide, to the closed loop circuit, an electrical-loop signal having a constant current. The receiver can include a variable resistance transducer, which is actuatable by a transfer switch between a first state in which the variable resistance transducer has a first resistance value and a second state the variable resistance transducer has a second resistance value.

In another example, a system for signaling a generator includes a generator includes a transmitter having a first input and a first output. The transmitter is configured to receive an input power signal from a power source. The system also includes a receiver having a second input and a second output, a first conductor coupling the first output of the transmitter to the second input of the receiver, and a second conductor coupling the second output of the receiver to the first input of the transmitter. The transmitter, the receiver, the first conductor, and the second conductor form a closed loop circuit.

The system can also include a controller configured to a controller configured to (i) determine a voltage of the input power signal, (ii) determine, based on the voltage of the input power signal, whether to activate the generator, and (iii) determine, based on the voltage of the input power signal, whether to activate an alarm system. The transmitter can include a constant-current source configured to use the input power signal to provide, to the closed loop circuit, an electrical-loop signal having a constant current. The receiver can include a variable resistance transducer, which is actuatable by a transfer switch between a first state in which the variable resistance transducer has a first resistance value and a second state the variable resistance transducer has a second resistance value.

In another example, a method for signaling a generator includes operatively coupling a transmitter to a generator, operatively coupling a receiver to a transfer switch, coupling a first conductor between a first output of the transmitter and a second input of the receiver, and coupling a second conductor between a second output of the receiver and a first input of the transmitter. The method also includes providing an input power signal from a power source to the transmitter. The method further includes transmitting, by a constant-current source of the transmitter, an electrical-loop signal around a closed loop circuit including the transmitter, the receiver, the first conductor, and the second conductor.

After transmitting the electrical-loop signal, the method includes determining a resistance of the closed loop circuit. If the determined resistance is zero, then the method includes activating an alarm system. If the determined resistance is infinite, then the method includes activating the alarm system. If the determined resistance is at a first reference-resistance value, then the method includes maintaining a deactivation of the generator. If the determined resistance is at a second reference-resistance value, then the method includes activating the generator.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 4 illustrates a logic table according to an example embodiment.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

As noted above, to transfer power between power sources, a transfer switch may initiate a signal sequence in which the transfer switch automatically starts a standby generator and then connects the standby generator to the load. One approach to performing the signal sequence involves closing and opening a contact of a single pole, single throw relay to transmit a control signal to the generator and thereby cause the generator to start.

Figure 1:
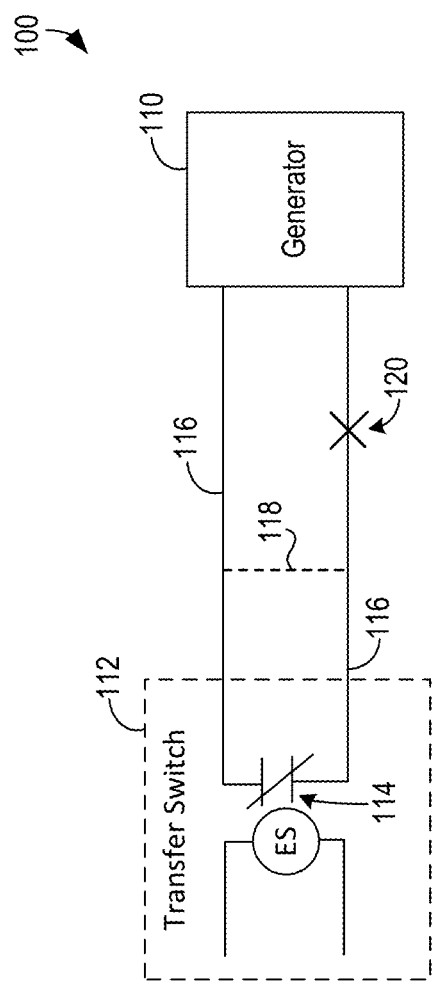
FIG. 1 illustrates a simplified block diagram of a signal system according to an example embodiment.

As an example, FIG. 1 depicts a block diagram of a signal system 100 for starting a generator 110. As shown in FIG. 1, the signal system 100 includes a transfer switch 112, a control relay 114, and the generator 110. The transfer switch 112 is operatively coupled to the control relay 114, and the control relay 114 is coupled to the generator 110 by a plurality of conductors 116. In this arrangement, the transfer switch 112 can actuate the control relay 114 to open or close a circuit of the control relay 114 and thereby provide the start signal to the generator 110. Upon receiving the start signal, the generator 110 starts up and begins generating power.

In some implementations, the conductors 116 can extend for a relatively long distance in a conduit between the control relay 114 and the generator 110. A problem with the type of signal system 100 shown in FIG. 1 is that when the integrity of the conductors 116 is compromised, the signal system 100 may not be able to properly signal the generator 110. For example, if the conduit is cut and the conductors 116 are shorted to each other, the generator 110 may receive a signal and start even though the transfer switch 112 did not actuate the control relay 114. An example short circuit condition is in shown in FIG. 1 by a dashed line 118.

Additionally, for example, if the conduit is cut and the conductors 116 are in an open circuit condition, the generator 110 cannot receive the start signal when the transfer switch 112 actuates the control relay 114. An example open circuit condition is shown in FIG. 1 by a "X" 120. Thus, because the signal system 100 cannot detect the short circuit condition 118 and/or the open circuit condition 120 on the conductors 116 for transmitting start signal to the generator 110, the generator 110 may improperly start when it is not needed and/or the generator 110 may not start when it is needed. This problem may be compounded in scenarios in which the conductors 116 are in a conduit and, therefore, not readily visible for inspection.

The systems and methods of the present disclosure provide signal systems and methods for signaling a generator and providing an alarm upon detection of a fault condition. In one example, a signal system includes a transmitter and a receiver. The transmitter is located at the generator and the receiver is located at a transfer switch. The transmitter is coupled to the receiver by a pair of conductors to form a closed loop circuit.

Within examples, the transmitter can receive an input power signal from a power source. In one example, the power source can be a direct current (DC) power source of the generator. The transmitter can use the input power signal to drive a constant current to the receiver on one of the conductors, and the receiver can return the constant current to the transmitter on the other one of the conductors. Because the current through the closed loop circuit is regulated to a constant value, a controller at the transmitter can determine a resistance of the loop by measuring the voltage required to drive the current (e.g., using Ohm's Law).

The receiver can include a variable resistance transducer, which can provide (i) a first resistance value to the closed loop circuit when the transfer switch signals for the generator to be deactivated, and (ii) a second resistance value to the closed loop circuit when the transfer switch signals the generate 110 to be activated. In some examples, because the receiver can be a passive device that is actuated by the transfer switch, the receiver can omit a power supply.

In operation, the controller can determine four different states of the closed loop circuit. In a first state, when the controller determines that the resistance of the closed loop circuit is at a first reference level, the controller can cause the engine to remain deactivated. In a second state, when the controller determines that the resistance of the closed loop circuit is at a second reference level, the controller can cause the engine to start. In a third state, when a short circuit condition exists between the conductors, the resistance of the closed loop circuit is infinite and the controller can cause an alarm signal to be generated. In a fourth state, when an open circuit condition exists for one or both of the conductors, the resistance of the closed loop circuit is zero and the controller can cause the alarm signal to be generated.

Figure 2:
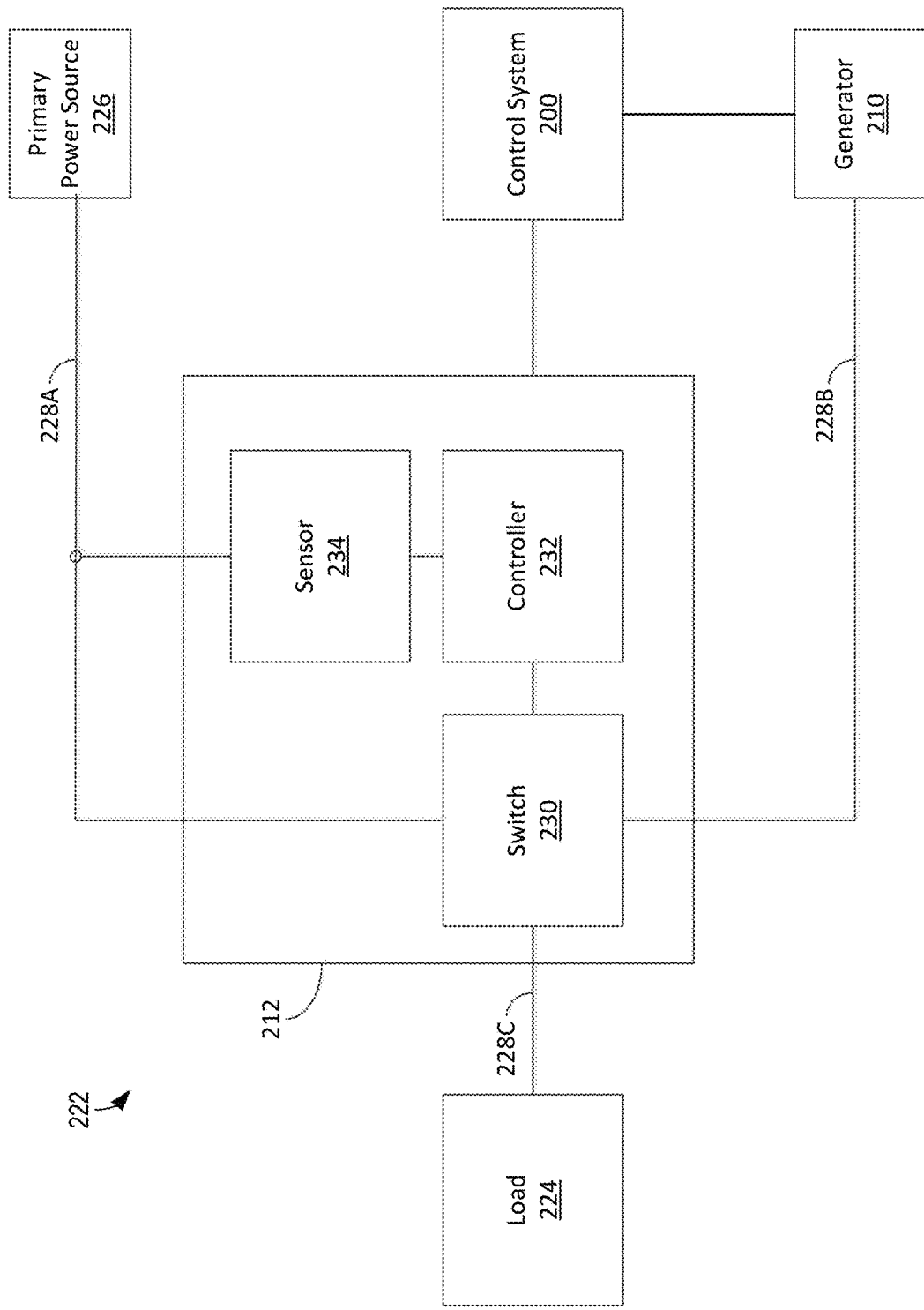
FIG. 2 illustrates a simplified block diagram of a power distribution system according to an example embodiment.

FIG. 2 is a block diagram of a power distribution system 222 in which a signal system 200 can be implemented according to an example embodiment of the present disclosure. As shown in FIG. 2, the power distribution system includes a transfer switch 212. The transfer switch 212 selectively couples a load 224 to either a primary power source 226 or a generator 210. In an example, the primary power source 226 can be provided by a power utility (e.g., via the electric grid), a battery, and/or a renewable energy power generation system (e.g., a wind power system, a hydro-electric power generation system, a solar power generation system, etc.). The generator 210 can be, for example, a diesel generator, a natural gas generator, a propane fuel generator, a renewable energy power generator. Additionally, within examples, the generator 210 can be a portable generator and/or a fixed installation generator.

As shown in FIG. 2, the primary power source 226 is coupled to the transfer switch 212 via a primary conductor 228A, the generator 210 is coupled to the transfer switch 212 via a secondary conductor 228B, and the transfer switch 212 is coupled to the load 224 via an output conductor 228C. In general, the primary power source 226 and the generator 210 can provide electric power in the form of an electric signal. In particular, for example, the electric signal can be an alternating current (AC) voltage signal.

While the primary power source 226, the generator 210, the conductors 228A-228C, and the load 224 are shown as a single-phase system in FIG. 2, other configurations can be utilized in other examples. For instance, the primary power source 226, the generator 210, the conductors 228A-228C, and/or the load 224 can be configured as a three-phase or another poly-phase system in other examples. In a single-phase system, the conductors 228A-228C carry a single electric signal. In a three-phase system, three conductors 228A-228C may each include multiple conductors to facilitate carrying three separate electric signals of the same frequency at different phases.

As also shown in FIG. 2, the transfer switch 212 includes a switch 230, which selectively connects the primary power source 226 or the generator 210 to the load 224. The switch 230 can thus include one or more electromechanical contactors, solid state devices, circuit breaker devices, and/or other suitable devices for electric power transfer. In one example, the switch 230 includes a solenoid that activates an electrical contact to move between a connection to the primary conductor 228A and a connection to the secondary conductor 228B. Other examples are also possible.

In practice, the switch 230 can be operably switched between multiple states. In a first state, the switch 230 can connect the primary power source 226 to the load 224. In a second state, the switch 230 can connect the generator 210 to the load 224. The switch 230 is selectively switched between the first state and the second state under control of a switch controller 232.

The switch controller 232 can thus provide control signals to the switch 230, which selectively control the state of the switch 230 to connect either the primary power source 226 or the generator 210 to the load 224. In some examples, the switch controller 232 controls the switch 230 based on an analysis of the electric signal transmitted on the primary conductor 228A from the primary power source 226 to the load 224. In particular, the switch controller 232 can monitor the electric signal on the primary conductor 228A for certain conditions, which indicate that it may be beneficial to switch the load 224 from the primary power source 226 to the generator 210 (e.g., an outage of the primary source 226 has or is likely to occur).

In an example, to monitor the electric signal on the primary conductor 228A, the switch controller 232 is coupled to the primary conductor 228A via a sensor 234. The sensor 234 senses the electric signal transmitted on the primary conductor 228A and provides an indication of one or more parameters of the electric signal (e.g., a magnitude of current, voltage, power, etc.) to the switch controller 232. As one example, the sensor 234 can include a current transformer coupled to the primary conductor 228A. In such an example, as current flows through the primary conductor 228A, the current transformer induces a current in the sensor 234 that is proportional to the current flowing through the primary conductor 228A. The sensor 234 and/or the switch controller 232 may then determine from the induced current a voltage or current of the electric signal transmitted on the primary conductor 228A from the primary power source 226 to the load 224. Other examples are also possible.

The switch controller 232 can be, for example, a microcontroller, a microprocessor, an application specific integrated circuit (ASIC) device, field programmable gate array (FPGA), programmable logic controller (PLC) or the like. The switch controller 232 can include memory to store any data required by the switch controller 232 for detecting conditions of the primary power source 226, initiating a power transfer, or executing any other functionality. For example, the memory can store one or more application code (e.g., main functionality firmware), initialization parameters, boot code, code for executing algorithms, code for determining a low-power and/or instability condition, code for setting user defined thresholds for algorithms, check sums to determine whether code is corrupted, lock codes, and/or other data. This data can be stored in the memory at the factory, manually entered via an input/output device (not shown), or remotely downloaded via the input/output device. The memory can be integrated with the switch controller 232, or the memory can be external and remotely coupled to the switch controller 232. The memory can be, for example, random access memory (RAM), read only memory (ROM), electronic erasable programmable read only memory (EEPROM), flash memory, or other volatile or non-volatile memory (i.e., non-transitory computer readable media).

As noted above, the transfer switch 212 can detect one or more fault conditions and automatically transfer the load 224 between the primary power source 226 and the generator 210. Accordingly, the transfer switch 212 shown in FIG. 2 can be an automatic transfer switch. However, in additional or alternative examples, the transfer switch 212 can be a manual transfer switch such that manual operation of transfer switch 212 transfers the load 224 between the primary power source 226 and the generator 210.

In either case, to transfer power between the primary power source 226 and the generator 210, the transfer switch 212 can initiate a signal sequence in which the transfer switch 212 starts the generator 210 so that the generator 210 can provide power to the load 224 upon the switch 230 switching from the first state to the second state. As shown in FIG. 2, the switch controller 232 is in communication with the signal system 200, and the signal system 200 is in communication with the generator 210. In this arrangement, when the switch controller 232 determines that the load 224 will be transferred from the primary power source 226 to the generator 210, the switch controller 232 can initiate a signal sequence to cause the generator 210 to start.

Figure 3:
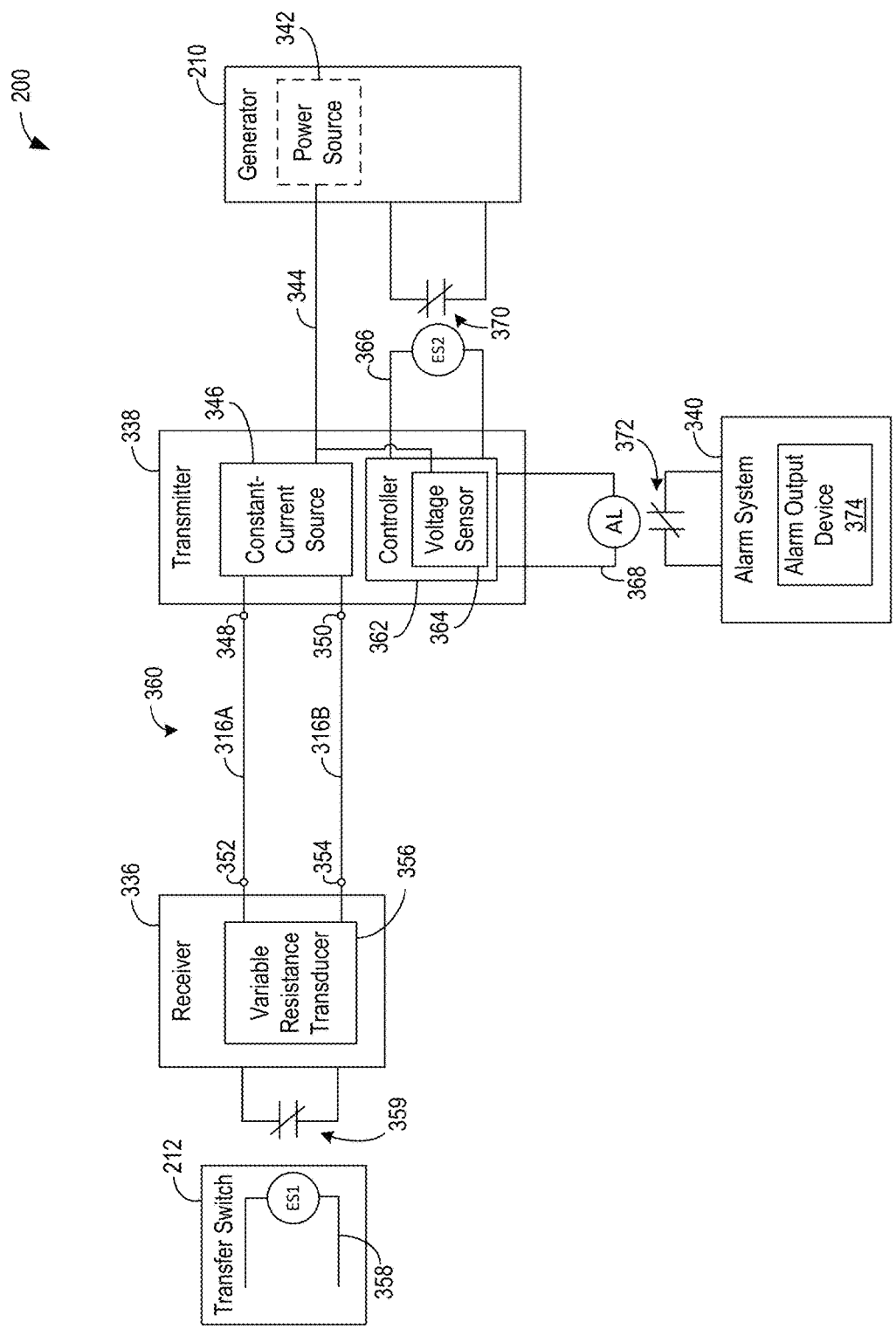
FIG. 3 illustrates a simplified block diagram of a signal system according to an example embodiment.

The signal system 200 can include one or more components for performing the signal sequence. FIG. 3 depicts the signal system 200 according to an example embodiment of the present disclosure. As shown in FIG. 3, the signal system 200 includes the transfer switch 212, a receiver 336, a plurality of conductors 316A-316B, a transmitter 338, an alarm system 340, and the generator 210. The transfer switch 212 is operably coupled to the receiver 336. The conductors 316A-316B couple the receiver 336 to the transmitter 338. The transmitter 338 is operably coupled to the generator 210. The transmitter 338 is also operably coupled to the alarm system 340.

As shown in FIG. 3, the transmitter 338 is located at the generator 210 and is powered by a power source 342. In FIG. 3, the generator 210 includes the power source 342; however, in an alternative example, the power source 342 can be separate from the generator 210. In general, the power source 342 can provide an input power signal to the transmitter 338 via a power-supply conductor 344, which couples the power source 342 to the transmitter 338. In an example, the power source 342 can be a DC power source (e.g., a battery), which provides the input power signal as a DC power to the transmitter 338. In some implementations, the DC power can be approximately 12 $V_{DC}$ or approximately 24 $V_{DC}$.

By the term "approximately," with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The transmitter 338 can include a constant-current source 346, which can receive the input power signal from the power source 342. The constant-current source 346 is coupled to a first output 348 of the transmitter 338 and a first input 350 of the transmitter 338. The constant-current source 346 can use the input power signal from the power source 342 to provide to the first output 348 an electrical-loop signal having a constant current, which is independent of a voltage across the constant-current source 346. That is, the current of the electrical-loop signal that is transmitted at the first output 348 of the transmitter 338 remains at an approximately constant amperage even when the resistance and, thus, the voltage between the first output 348 and the first input 350 changes.

The constant-current source 346 can include one or more electrical devices, which can provide for constant current regulation. As examples, the constant-current source 346 can include one or more current mirror circuits, transistors, Zener diodes, negative feedback circuits, transistors, and/or op-amps. Other examples are also possible.

As also shown in FIG. 3, the receiver 336 is located at the transfer switch 212. The receiver 336 includes a second input 352 and a second output 354. The conductors 316A, 316B include a first conductor 316A, which couples the first output 348 of the transmitter 338 to the second input 352 of the receiver 336. The conductors 316A, 316B also include a second conductor 316B, which couples the second output 354 of the receiver 336 to the first input 350 of the transmitter 338.

Additionally, as shown in FIG. 3, the receiver 336 includes a variable resistance transducer 356 coupled to the second input 352 and the second output 354 of the receiver 336. The variable resistance transducer 356 is actuatable to adjust a resistance between the second input 352 of the receiver 336 and the second output 354 of the receiver 336. For instance, the variable resistance transducer 356 can have a first state in which the variable resistance transducer 356 has a first resistance value, and a second state in which the variable resistance transducer 356 has a second resistance value that is different than the first resistance value.

As one example, the variable resistance transducer 356 can include a sliding contact device. As another example, the variable resistance transducer 356 can include a single pole, double throw switch (i.e., a changeover switch). For instance, the single pole, double throw switch can have a first terminal coupled to the second input 352, a second terminal coupled to the second output 354 by a first resistor, and a third terminal coupled to the second output 354 by a second resistor. The first terminal can be coupled to the second terminal when the variable resistance transducer 356 is in the first state, and the first terminal can be coupled to the third terminal when the variable resistance transducer 356 is in the second state. As such, the resistance of the variable resistance transducer 356 can be adjusted by actuating the switch of the variable resistance transducer 356.

In general, the transfer switch 212 is operable to actuate the variable resistance transducer 356 of the receiver 336 between the first state and the second state. In one example, when the transfer switch 212 receives power from the primary power source 226, the transfer switch 212 conducts an electric signal through a circuit 358 and the electric signal energizes the variable resistance transducer 356. While the variable resistance transducer 356 is energized, the variable resistance transducer 356 is in the first state. Whereas, when the transfer switch 212 does not receive power from the primary power source 226 (e.g., due to a power interruption), the transfer switch 212 may not conduct the electric signal through the circuit 358 and the variable resistance transducer 356 is de-energized. While the variable resistance transducer 356 is de-energized, the variable resistance transducer 356 is in the second state.

Accordingly, the transfer switch 212 can selectively energize and de-energize the variable resistance transducer 356 to actuate the variable resistance transducer 356 between the first state and the second state and, thus, change the resistance of the variable resistance transducer 356 between the first resistance value and the second resistance value, respectively. Stated differently, the variable resistance transducer 356 can transduce the presence and the absence of the electric signal on the circuit 358 of the transfer switch 212 to the first resistance value and the second resistance value, respectively.

For instance, in one example, the transfer switch 212 can conduct the electric signal through the circuit 358 to energize a normally closed relay 359 of the receiver 336. While the transfer switch 212 provides the electric signal at the circuit 358, the normally closed relay 359 remains in an open state, which causes the variable resistance transducer is in the first state. Whereas, when the transfer switch 212 ceases to provide the electric signal at the circuit 358, the normally closed relay 359 actuates to the closed state, which causes the variable resistance transducer to be in the second state.

In one implementation, for instance, the electric signal conducted through circuit 358 can include at a least a portion of the power conducted by the transfer switch 212 from the primary power source 226 to the load 224. In this way, when the primary power source 226 is providing power to the load 224, the transfer switch 212 can actuate the variable resistance transducer 356 to the first state. Whereas, when the primary power source 226 is not providing power to the load 224, the transfer switch 212 can actuate the variable resistance transducer 356 to the second state.

In this arrangement, when no fault condition exists on the conductors 316A, 316B, a closed loop circuit 360 is formed by the constant-current source 346 of the transmitter 338, the first conductor 316A, the variable resistance transducer 356 of the receiver 336, and the second conductor 316B. Accordingly, when no fault condition exists on the conductors 316A, 316B, the constant-current source 346 uses the input power received from the power source 342 to provide the electrical-loop signal having the constant current at the first output 348 of the transmitter 338. The first conductor 316A conducts the electrical-loop signal from the first output 348 of the transmitter 338 to the second input 352 of the receiver 336. At the receiver 336, the electrical-loop signal passes from the second input 352, through the variable resistance transducer 356, to the second output 354. The second conductor 316B then conducts the electrical-loop signal from the second output 354 of the receiver 336 to the first input 350 of the transmitter 338.

Within examples, the transmitter 338 can determine whether the variable resistance transducer 356 is in the first state or the second state and, thus, whether the transfer switch 212 signaled to initiate the signal sequence for starting the generator 210. As noted above, the constant-current source 346 drives the electrical-loop signal through the closed loop circuit 360 such that the current of the electrical-loop signal remains constant. By contrast, the resistance of the variable resistance transducer 356 can change based on whether the variable resistance transducer 356 is in the first state or the second state, which in turn is based on whether of the transfer switch 212 energizes or de-energizes the circuit 358. In accordance with Ohm's law (i.e., R=V/I), a change to the resistance of the variable resistance transducer 356 causes a corresponding change to a voltage of the input power signal, which is drawn by the constant-current source 346 to supply the electrical-loop signal at the constant current. As such, the voltage of the input power signal on the power-supply conductor 344 can provide an indication of the resistance of the closed loop circuit 360 and, thus, the state of the variable resistance transducer 356 (i.e., whether the transfer switch 212 has signaled to start the generator).

As shown in FIG. 3, the transmitter 338 can include a controller 362, which can include a voltage sensor 364. The voltage sensor 364 can be operatively coupled to the power-supply conductor 344. As such, the voltage sensor 364 can sense the voltage of the input power signal supplied from the power source 342 to the constant-current source 346. When the variable resistance transducer 356 is in the first state and has the first resistance, the voltage of the input power signal has a first voltage value. Whereas, when the variable resistance transducer 356 is in the second state and has the second resistance, the voltage of the input signal has a second voltage value. As the first resistance value is different than the second resistance value, the first voltage value is different than the second voltage value.

In one example, to determine the state of the variable resistance transducer 356, the controller 362 can (i) determine, using the voltage sensor 364, the voltage of the input power signal, (ii) perform a comparison of the determined voltage of the input power signal to a first reference-voltage value and a second reference-voltage value, (iii) determine, based on the comparison, that the variable resistance transducer 356 is in the first state when the determined voltage of the input power signal is at the first reference-voltage value, and (iv) determine, based on the comparison, that the variable resistance transducer 356 is in the second state when the determined voltage of the input power signal is at the second reference-voltage value.

In one implementation, the first reference-voltage value can be a predetermined value that is based on (or approximately equal to) the constant current provided by the constant-current source 346 multiplied by the first resistance value of the variable resistance transducer 356. Similarly, the second reference-voltage value can be a predetermined value that is based on (or approximately equal to) the constant current provided by the constant-current source 346 multiplied by the second resistance value of the variable resistance transducer 356. Within examples, the first reference-voltage value and/or the second reference-voltage value can each be a respective value or range of values.

In another example, to determine the state of the variable resistance transducer 356, the controller 362 can (i) determine, using the voltage sensor 364, the voltage of the input power signal, (ii) determine, based on the determined voltage of the input power signal, a resistance of the closed loop circuit 360, (iii) perform a comparison of the determined resistance to a first reference-resistance value and a second reference-resistance value, (iv) determine, based on the comparison, that the variable resistance transducer 356 is in the first state when the determined resistance of the closed loop circuit 360 is at the first reference-resistance value, and (v) determine, based on the comparison, that the variable resistance transducer 356 is in the second state when the determined resistance of the closed loop circuit 360 is at the second reference-resistance value.

In one implementation, the first reference-resistance value can be a predetermined value that is based on (or approximately equal to) the first resistance value of the variable resistance transducer 356. Similarly, the second reference-voltage value can be a predetermined value that is based on (or approximately equal to) the second resistance value of the variable resistance transducer 356. Within examples, the first reference-resistance value and/or the second reference-resistance value can each be a respective value or range of values.

Accordingly, as described above, the controller 362 can determine the voltage of the input power signal on the power-supply conductor 344 and/or the resistance of closed loop circuit 360, and use the determined voltage and/or resistance as a basis for determining whether the variable resistance transducer 356 is in the first state or the second state. And, based on a determination that the variable resistance transducer 356 is in the first state or the second state, the controller 362 can determine whether the transfer switch 212 signaled for the generator 210 to start.

Additionally, the controller 362 can use the voltage of the input power signal and/or the resistance of the closed loop circuit 360 to determine when a fault condition exists. For example, when a short circuit condition exists between the first conductor 316A and the second conductor 316B, the resistance of the closed loop circuit 360 is infinite and the voltage of the input power signal increases to a relatively high (or maximum) voltage value. Whereas, when an open circuit condition exists on first conductor 316A and/or the second conductor 316B, the resistance of the closed loop circuit 360 is approximately zero and the voltage of the input power signal decreases to a nominal (or approximately zero) voltage value.

Within examples, based on the voltage of the input power signal provided by the power source 342 to the constant-current source 346, the controller 362 can determine whether to activate the generator 210 and/or activate the alarm system 340. FIG. 4 depicts a table showing logic that can be implemented by the controller 362 to determine, based on the voltage of the input power signal and/or the resistance of the closed loop circuit 360, whether to activate the generator 210 and/or activate the alarm system 340 according to one example embodiment. As shown in FIG. 4, at a given time, the controller 362 can determine that the closed loop circuit 360 is in one of four possible circuit states based on the voltage of the input power signal and/or the resistance of the closed loop circuit 360. Each circuit state determinable by the controller 362 corresponds to a respective one of the following four scenarios.

In a first scenario, the transfer switch 212 energizes the variable resistance transducer 356 and no fault condition exists on the conductors 316A, 316B. While the transfer switch 212 energizes the variable resistance transducer 356, the variable resistance transducer 356 has the first resistance value. Because no fault condition exists, the resistance of the closed loop circuit 360 is based on the first resistance value of the variable resistance transducer 356. The constant-current source 346 thus draws the input power signal from the power source 342 at the first voltage value.

The voltage sensor 364 senses the voltage of the input power signal and provides an indication of the sensed voltage to the controller 362. The controller 362 can determine that, based on the indication of the sensed voltage, the voltage of the input power is at the first reference-voltage value and/or the resistance of the closed loop circuit 360 is at the first reference-resistance value. Based on the determination that the voltage of the input power signal is at the first reference-voltage value and/or the resistance of the closed loop circuit 360 is at the first reference-resistance value, the controller 362 can then determine that the variable resistance transducer 356 is in the first state and, thus, the transfer switch 212 is energized (i.e., that the transfer switch 212 receives power from the primary power source 226). As shown in FIG. 4, responsive to the controller 362 determining that the voltage of the input power is at the first reference-voltage value and/or the resistance of the closed loop circuit 360 is at the first reference-resistance value, the controller 362 does not activate (i.e., maintains the deactivation) the generator 210 and the alarm system 340.

In a second scenario, the transfer switch 212 de-energizes the variable resistance transducer 356 and no fault condition exists on the conductors 316A, 316B. While the transfer switch 212 de-energizes the variable resistance transducer 356, the variable resistance transducer 356 has the second resistance value. Because no fault condition exists, the resistance of the closed loop circuit 360 is based on the second resistance value of the variable resistance transducer 356. The constant-current source 346 thus draws the input power signal from the power source 342 at the second voltage level.

The voltage sensor 364 senses the voltage of the input power signal and provides an indication of the sensed voltage to the controller 362. The controller 362 can determine that, based on the indication of the sensed voltage, the voltage of the input power is at the second reference-voltage value and/or the resistance of the closed loop circuit 360 is at the second reference-resistance value. Based on the determination that the voltage of the input power signal is at the second reference-voltage value and/or the resistance of the closed loop circuit 360 is at the second reference-resistance value, the controller 362 can then determine that the variable resistance transducer 356 is in the second state and, thus, the transfer switch 212 is de-energized (i.e., that the transfer switch 212 does not receive power from the primary power source 226). As shown in FIG. 4, responsive to the controller 362 determining that the voltage of the input power is at the second reference-voltage value and/or the resistance of the closed loop circuit 360 is at the second reference-resistance value, the controller 362 activates the generator 210 and does not activate (i.e., maintains the deactivation) the alarm system 340.

In a third scenario, when a short circuit condition exists on the conductors 316A-316B, the resistance of the closed loop circuit 360 is infinite. Thus, in this scenario, the constant-current source 346 draws the input power signal at a voltage, which is substantially higher than the first reference-voltage value and the second reference-voltage value. As shown in FIG. 4, responsive to the controller 362 determining that the voltage of the input power signal is greater than a first threshold value, the controller 362 activates the alarm system 340 and does not activate (i.e., maintains the deactivation) the generator 210. The first threshold value can be a value that is greater than the first reference-voltage value and the second reference-voltage value.

In a fourth scenario, when an open circuit condition exists on the conductors 316A-316B, the resistance of the closed loop circuit 360 is zero. Thus, in this scenario, the constant-current source 346 draws the input power signal at a voltage, which is substantially lower than the first reference-voltage value and the second reference-voltage value. As shown in FIG. 4, responsive to the controller 362 determining that the voltage of the input power signal is less than a second threshold value, the controller 362 activates the alarm system 340 and does not activate (i.e., maintains the deactivation) the generator 210. The second threshold value can be a value that is less than the first reference-voltage value and the second reference-voltage value.

As described above, the controller 362 can activate and/or maintain deactivation of the generator 210 and/or the alarm system 340. In the example shown in FIG. 3, the controller 362 includes a first-controller output 366 operatively coupled to the generator 210 and a second-controller output 368 operatively coupled to the alarm system 340. In this example, the controller 362 can provide a signal at the first-controller output 366, which energizes a first normally closed relay 370 of the generator 210. While the controller 362 provides the signal at the first-controller output 366, the first normally closed relay 370 remains in an open state so that a start signal is not provided to the generator 210. Whereas, when the controller 362 ceases to provide the signal at the first-controller output 366, the first normally closed relay 370 actuates to the closed state and provides the start signal to the generator 210. Responsive to the start signal, the generator 210 starts up and begins generating power.

Similarly, in FIG. 3, the controller 362 can provide a signal at the second-controller output 368, which energizes a second normally closed relay 372 of the alarm system 340. While the controller 362 provides the signal at the second-controller output 368, the second normally closed relay 372 remains in an open state so that an alarm signal is not provided to the alarm system 340. Whereas, when the controller 362 ceases to provide the signal at the second-controller output 368, the second normally closed relay 372 actuates to the closed state and provides the alarm signal to the alarm system 340. Responsive to the alarm signal, the alarm system 340 can actuate an alarm output device 374 to generate an auditory alarm and/or a visual alarm.

As examples, the alarm output device 374 can include one or more audio speakers, lights, and/or video displays. More generally, the alarm output device 374 can include any device that can alert personnel to the occurrence of a fault condition (e.g., an open circuit fault and/or a short circuit fault on the conductors 316A-316C). In additional or alternative examples, the alarm output device 374 can also provide information relating to the fault condition (e.g., whether the fault condition is an open circuit condition or a short circuit condition).

The controller 362 can be, for example, a microcontroller, a microprocessor, an application specific integrated circuit (ASIC) device, field programmable gate array (FPGA), programmable logic controller (PLC) or the like. In FIG. 3, the controller 362 can include and/or be coupled to a memory. The memory can store any data required by the controller 362 for determining the states indicated by the first signal and the second signal, determining whether to activate the generator 210, determine whether to activate the alarm system 340, and/or executing any other functionality. For example, the memory can store one or more threshold values, application code (e.g., main functionality firmware), initialization parameters, boot code, code for executing algorithms, code for determining a low-power and/or instability condition, code for setting user defined thresholds for algorithms, check sums to determine whether code is corrupted, lock codes, and/or other data. This data can be stored in the memory at the factory, manually entered via an input/output device (not shown), or remotely downloaded via the input/output device. The memory can be integrated with the controller, or the memory can be external and remotely coupled to the controller 362. The memory can be, for example, random access memory (RAM), read only memory (ROM), electronic erasable programmable read only memory (EEPROM), flash memory, or other volatile or non-volatile memory (i.e., non-transitory computer readable media).

Figure 5:
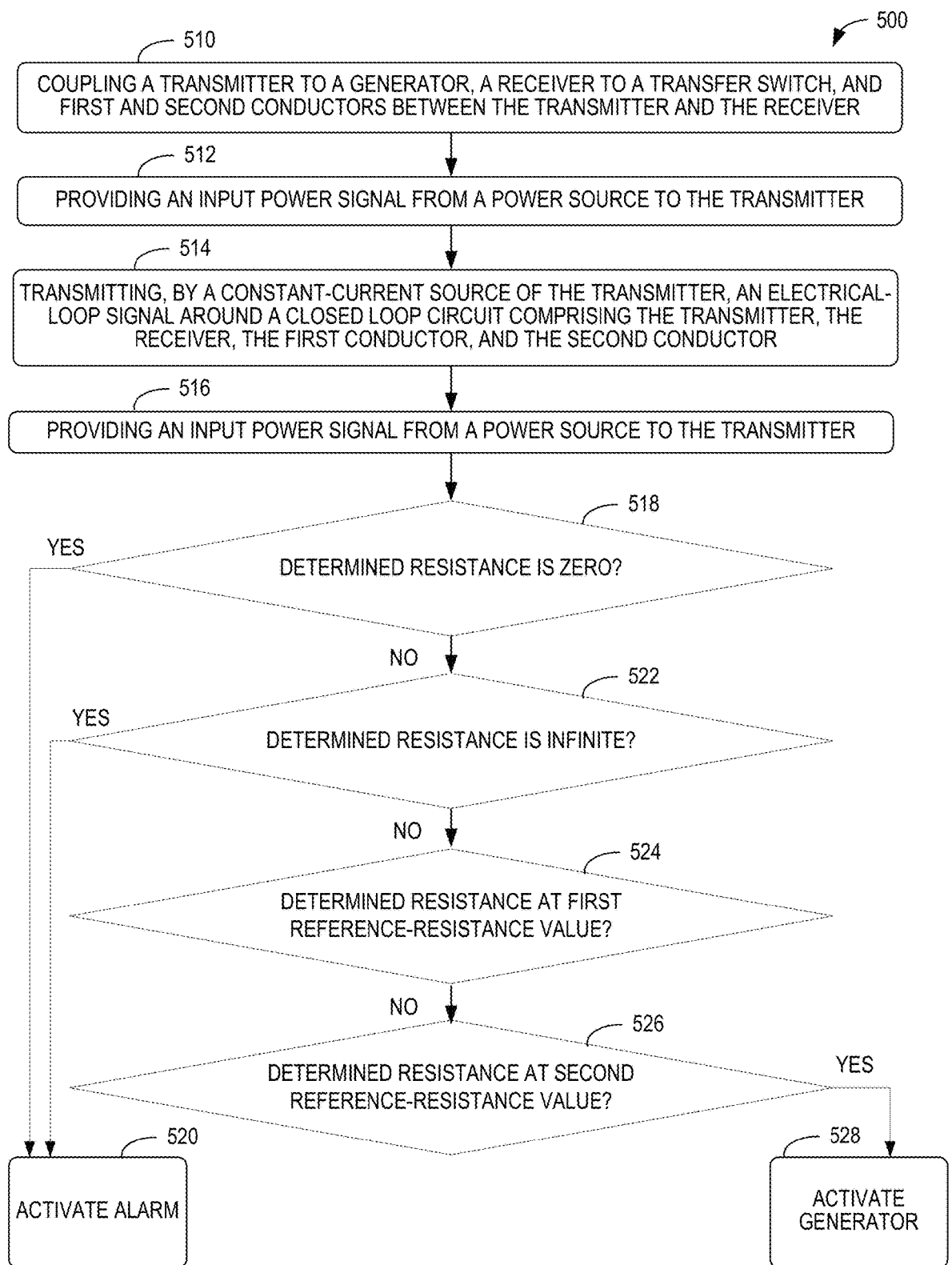
FIG. 5 illustrates a flowchart of a process for signaling a generator according to an example embodiment.

Referring now to FIG. 5, a flowchart for a process 500 for signaling a generator is illustrated according to an example embodiment.

As shown in FIG. 5, at block 510, the process 500 includes operatively coupling a transmitter to a generator, operatively coupling a receiver to a transfer switch, coupling a first conductor between a first output of the transmitter and a second input of the receiver. At block 512, the process 500 includes providing an input power signal from a power source to the transmitter. At block 514, the process 500 includes transmitting, by a constant-current source of the transmitter, an electrical-loop signal around a closed loop circuit including the transmitter, the receiver, the first conductor, and the second conductor.

After transmitting the electrical-loop signal at block 514, the process 500 includes determining a resistance of the closed loop circuit at block 516. At block 518, the process 500 can include determining whether the resistance determined at block 514 is zero. If it is determined at block 518 that the determined resistance is zero, then the process 500 includes activating an alarm system at block 520. Otherwise, if it is determined at block 518 that the resistance is not zero, then the process 500 can proceed to block 522.

At block 522, the process 500 can include determining whether the resistance determined at block 514 is infinite. If it is determined at block 522 that the determined resistance is infinite, then the process 500 includes activating an alarm system at block 520. Otherwise, if it is determined at block 522 that the resistance is not infinite, then the process 500 can proceed to block 524.

At block 524, the process 500 can include determining whether the resistance determined at block 514 is at a first reference-resistance value. If it is determined at block 524 that the determined resistance is at the first reference-resistance value, then the process 500 includes maintain deactivation of the generator and the alarm. Otherwise, if it is determined at block 524 that the resistance is not at the first reference-resistance value, then the process 500 can proceed to block 526.

At block 526, the process 500 can include determining whether the resistance determined at block 514 is at a second reference-resistance value. If it is determined at block 524 that the determined resistance is at the second reference-resistance value, then the process 500 includes activating the generator at block 528.

Any of the blocks shown in FIG. 5 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A system for signaling a generator, comprising:
a transmitter having a first input and a first output, wherein the transmitter is suitable to receive an input power signal from a power source;
a receiver having a second input and a second output;
a first conductor coupling the first output of the transmitter to the second input of the receiver;
a second conductor coupling the second output of the receiver to the first input of the transmitter, wherein the transmitter, the receiver, the first conductor, and the second conductor form a closed loop circuit; and
a controller suitable to (i) determine a voltage of the input power signal, (ii) determine, based on the determined voltage of the input power signal, a resistance of the closed loop circuit, (iii) determine, based on the determined resistance of the closed loop circuit, whether to activate the generator, and (iv) determine, based on the determined resistance of the closed loop circuit, whether to activate an alarm system,
wherein the transmitter comprises a constant-current source suitable to use the input power signal to provide, to the closed loop circuit, an electrical-loop signal having a constant current, and
wherein the receiver comprises a variable resistance transducer, which is actuatable by a transfer switch between a first state in which the variable resistance transducer has a first resistance value and a second state the variable resistance transducer has a second resistance value.

2. The system of claim 1, wherein the generator comprises the power source.

3. The system of claim 1, wherein the controller comprises a voltage sensor suitable to sense the voltage of the input power signal.

4. The system of claim 1, wherein, to determine whether to activate the generator and whether to activate the alarm system, the controller is suitable such that:
   if the determined resistance is zero, the controller activates the alarm system;
   if the determined resistance is infinite, the controller activates the alarm system;
   if the determined resistance is at a first reference-resistance value, the controller does not activate the generator; and
   if the determined resistance is at a second reference-resistance value, the controller activates the generator.

5. The system of claim 1, wherein, when a short circuit condition exists on the first conductor and the second conductor, the determined resistance of the closed loop circuit is infinite, and
   wherein, when an open circuit condition exists on at least one of the first conductor or the second conductor, the determined resistance of the closed loop circuit is zero.

6. The system of claim 1, further comprising the alarm system, wherein the alarm system is configured to provide at least one of an auditory alarm or a visual alarm.

7. The system of claim 1, wherein the transfer switch is an automatic transfer switch.

8. A system for signaling a generator, comprising:
   a transmitter having a first input and a first output, wherein the transmitter is suitable to receive an input power signal from a power source;
   a receiver having a second input and a second output;
   a first conductor coupling the first output of the transmitter to the second input of the receiver;
   a second conductor coupling the second output of the receiver to the first input of the transmitter, wherein the transmitter, the receiver, the first conductor, and the second conductor form a closed loop circuit; and
   a controller suitable to (i) determine a voltage of the input power signal and (ii) determine, based on the voltage of the input power signal, whether to start the generator and whether to activate an alarm system,
   wherein the transmitter comprises a constant-current source suitable to use the input power signal to provide, to the closed loop circuit, an electrical-loop signal having a constant current, and
   wherein the receiver comprises a variable resistance transducer, which is actuatable by a transfer switch between a first state in which the variable resistance transducer has a first resistance value and a second state the variable resistance transducer has a second resistance value.

9. The system of claim 8, wherein the generator comprises the power source.

10. The system of claim 8, wherein the controller comprises a voltage sensor suitable to sense the voltage of the input power signal.

11. The system of claim 8, wherein, to determine whether to activate the generator and whether to activate the alarm system, the controller is configured such that:
   if the determined voltage of the input power signal is greater than a first threshold value, the controller activates the alarm system;
   if the determined voltage of the input power signal is less than a second threshold value, the controller activates the alarm system;
   if the determined resistance is at a first reference-voltage value, the controller does not activate the generator; and
   if the determined resistance is at a second reference-voltage value, the controller activates the generator.

12. The system of claim 8, wherein, when a short circuit condition exists on the first conductor and the second conductor, the determined voltage of the input power signal is a maximum voltage value, and
   wherein, when an open circuit condition exists on at least one of the first conductor or the second conductor, the determined voltage of the input power signal is approximately zero.

13. The system of claim 8, further comprising the alarm system, wherein the alarm system is suitable to provide at least one of an auditory alarm or a visual alarm.

14. The system of claim 8, wherein the transfer switch is an automatic transfer switch.

15. A method for signaling a generator, comprising:
   operatively coupling a transmitter to a generator;
   operatively coupling a receiver to a transfer switch;
   coupling a first conductor between a first output of the transmitter and a second input of the receiver;
   coupling a second conductor between a second output of the receiver and a first input of the transmitter;
   providing an input power signal from a power source to the transmitter;
   transmitting, by a constant-current source of the transmitter, an electrical-loop signal around a closed loop circuit comprising the transmitter, the receiver, the first conductor, and the second conductor;
   after transmitting the electrical-loop signal, determining a resistance of the closed loop circuit;
   if the determined resistance is zero, then activating an alarm system;
   if the determined resistance is infinite, then activating the alarm system;
   if the determined resistance is at a first reference-resistance value, then maintaining a deactivation of the generator; and
   if the determined resistance is at a second reference-resistance value, then activating the generator.

16. The method of claim 15, wherein the receiver comprises a variable resistance transducer, which is actuatable by the transfer switch between a first state in which the variable resistance transducer has a first resistance value and a second state the variable resistance transducer has a second resistance value, and
   wherein the method further comprises actuating the variable resistance transducer from the first state to the second state when the transfer switch does not receive power from a primary power source.

17. The method of claim 16, wherein, when the variable resistance transducer is in the first state, a current of the electrical-loop signal is the same as the current of the electrical-loop signal when the variable resistance transducer is in the second state.

18. The method of claim 15, wherein transmitting, by the constant-current source of the transmitter, the electrical-loop signal around the closed loop circuit comprises regulating a current of the electrical-loop signal to have a constant current.

19. The method of claim 15, wherein providing the input power signal from the power source to the transmitter comprises providing a direct current (DC) power from the generator to the transmitter.

20. The method of claim 15, wherein the determined resistance is zero when a short circuit condition exists between the first conductor and the second conductor, and the determined resistance is infinite when an open circuit condition exists for at least one of the first conductor or the second conductor.

* * * * *